United States Patent [19]

Morris

[11] Patent Number: 4,587,668

[45] Date of Patent: May 6, 1986

[54] X RAY UNIT FOR PODIATRY

[75] Inventor: William W. Morris, Woodstock, Ill.

[73] Assignee: X-Cel X-Ray Corporation, Crystal Lake, Ill.

[21] Appl. No.: 627,293

[22] Filed: Jul. 2, 1984

[51] Int. Cl.[4] ........................ H05G 1/02; F16M 11/12

[52] U.S. Cl. ................................ 378/197; 248/280.1; 248/281.1; 248/325; 248/123.1; 248/183

[58] Field of Search ............... 378/192, 197, 196, 195; 248/280.1, 281.1, 325, 123.1, 183

[56] References Cited

U.S. PATENT DOCUMENTS 4,166,602 9/1979 Nilsen et al. ........................ 378/197

*Primary Examiner*—Alfred E. Smith
*Assistant Examiner*—Jack I. Berman
*Attorney, Agent, or Firm*—Marshall, O'Toole, Gerstein, Murray & Bicknell

[57] ABSTRACT

An X ray unit for podiatry wherein the base platform is disposed approximately three inches above floor level. The X ray machine is disposed above the base platform and is adapted to be moved to various positions by a mounting system which includes a pivotable rectangular frame or trunnion to which vertical mounting members are pivotally mounted. A first yoke extends from one of the vertical mounting members and is connected to a pivotable block to which a second yoke is pivotally connected. A fastener is threaded in the second yoke and is attached to one end of a chain member which is seated in a chain sprocket mounted in a pivotable sprocket block. The remaining chain end is fastened to a compression spring assembly disposed in a substantially horizontal position.

15 Claims, 9 Drawing Figures

X RAY UNIT FOR PODIATRY

This invention relates to a new and improved X ray unit for use in podiatry and more particularly to an improved X ray mounting system which serves to permit the utilization of a patient foot platform which is disposed only several inches above floor level.

BACKGROUND OF THE INVENTION

Presently, X ray units employed in the practice of podiatry include a platform upon which a patient places his or her feet to be X-rayed. The base or platform is raised about eight to eleven inches above the floor level. An X ray machine is mounted on vertical mounting members which serve to space the X-ray machine several feet above the foot platform with the machine being adapted to be moved to various positions whereby X rays of a patient's feet can be taken from many angles.

While X ray units presently available perform satisfactorily in many instances, problems exist in connection with X-raying the feet of elderly patients or individuals whose balance or ability to mount the platform is impaired due to disease or other conditions, such as arthritis. It has been found that often it is extremely difficult for these patients to move their limbs to mount the platform though it is only eight to eleven inches above floor level.

The base height generally is dictated by the mechanism employed for pivoting the X ray unit about its axes and the mounting systems used in conventional X ray units require a base height of eight inches or more.

What is desired is an X ray apparatus for use in podiatry which has a base platform substantially reduced in height compared to conventional units; however, the ability of the X ray machine to be moved to various desired positions is not impaired.

SUMMARY OF THE INVENTION

The invention disclosed and claimed herein serves to solve the above-mentioned problems existing with conventional X ray units. More specifically, the present invention reduces the height of the X ray platform whereby a patient is able to stand on a platform located approximately two to four inches above floor level. The substantial difference in platform height reduction between the prior art units and the X ray unit disclosed and claimed herein is highly desirable and serves to obviate the difficulties various patients experience in lifting their feet to stand on the X ray platform.

The present invention is able to achieve the desired platform height reduction by means of a new and improved mounting assembly which positions the X ray machine relative to the base of the unit. More specifically, the mounting assembly of the present invention utilizes less space than is utilized with X ray mounting assemblies of conventional units whereby the base of the unit is reduced in height and the desired ease of movement of the X ray machine to various X ray positions is maintained.

Briefly, the X ray unit mounting assembly of the present invention comprises a spring biased assembly which permits the X ray machine to be positioned in any number of locations relative to the base or pedestal upon which an individual's feet are positioned. The spring assembly is located in a horizontal position and includes a compression spring means having one end attached to a chain seated on a pivotally mounted sprocket. The opposite end of the chain is fastened to a threaded screw located in the cross bar of a yoke. The yoke is pivotally connected to a mounting block, which, in turn, is pivotally connected to another yoke which is connected to one of a pair of vertical mounting members. The vertical mounting members to which the X ray machine is mounted are disposed in a pivotable frame or trunnion.

When the X ray machine is moved from its normal vertical position, the spring means will be placed in torsion whereby the chain is pulled outward and the yokes, block and trunnion pivot relative to each as required whereby the X ray machine is displaced to at a desired position. When the X ray machine is returned to its normal vertical position, the chain is returned to its normal position by the horizontally positioned spring means.

Additionally, the provision of a rotatable fastener means precludes the chain from being twisted or stressed an undesired amount about its longitudinal axis thereby obviating any undesired force on the chain, the effect of which would be to damage or destroy the chain.

A better understanding of the invention will be seen and understood from the various drawings and detailed description.

DETAILED DESCRIPTION

Figure 2:
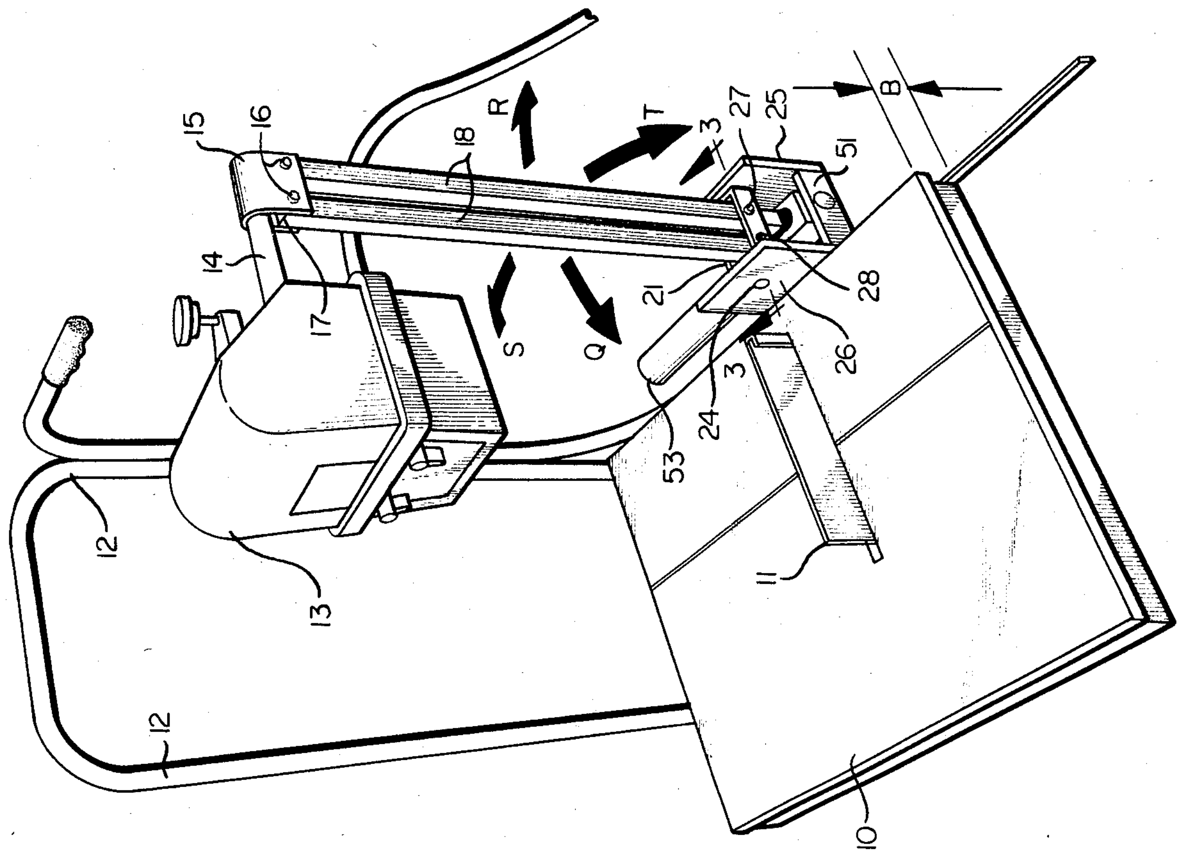
FIG. 2 shows a perspective view of a X ray unit mounted on a new and improved mounting apparatus whereby the height of the patient foot platform is substantially reduced as compared to the height of the conventional mounting pedestal of the unit shown in FIG. 1.

Referring to the drawings, there is shown a conventional X ray unit used for podiatry purposes comprising a patient platform 10, and a foot separation plate 11 extending perpendicular to platform or base 10. Hand rail legs 12 are mounted to the base and serve to form a patient support hand rail shown more clearly in FIG. 2.

An X ray machine 13 is mounted, as shown in FIG. 2, on one end of an arm 14 while the remaining end of arm 14 is joined to a U-shaped mounting plate 15 which is bolted at 16 to the upper ends 17 of a pair of vertical mounting members 18.

Figure 1:
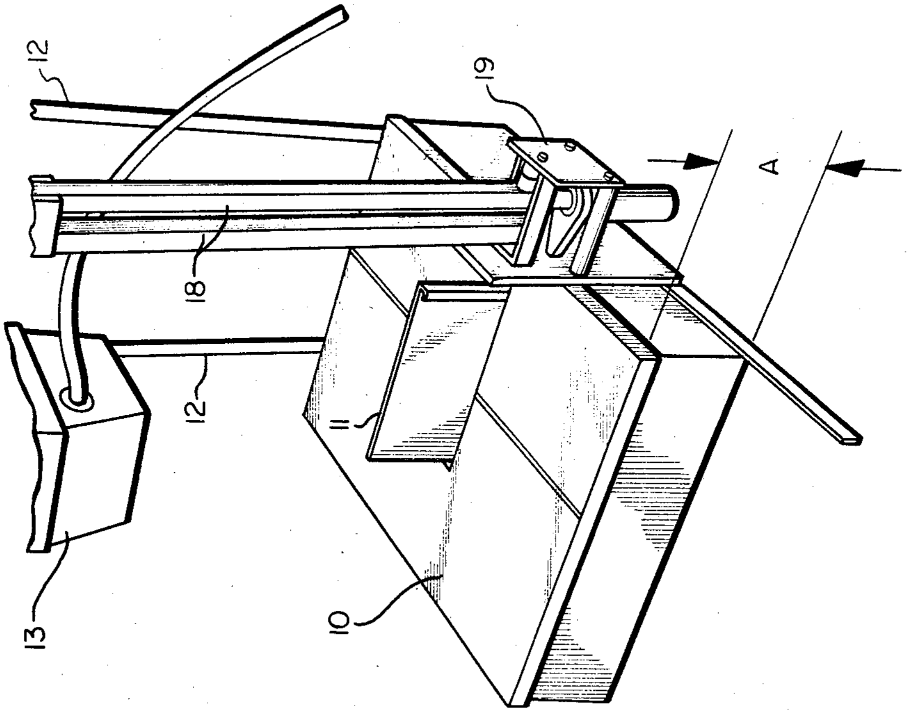
FIG. 1 PRIOR ART
FIG. 1 shows a perspective view of a conventional prior art X ray unit used by podiatrists and others for X-raying one or both feet of a patient.

As shown in FIG. 1, the remaining ends of vertical members 18 are disposed in a mounting apparatus 19 which includes a vertically positioned spring biasing assembly, including a compression spring, not shown. To accommodate the vertically positioned spring means and mounting assembly, base 10 is elevated relative to the floor level by a dimension "A", which is approximately eight to eleven inches. The length and size of the spring is a function of the weight of the X ray machine 13 whose weight must be counterbalanced as the X ray machine is moved from its normal position where mounting members 18 are positioned vertically as shown in FIGS. 1 and 2.

Turning to FIG. 2, it will be observed that patient foot platform base 10 is reduced to a dimension "B", which is approximately two-and-a-half to three-and-a-half inches. The reduction in the base shown in FIGS. 1 and 2 is achieved through the use of a new and improved X ray unit mounting apparatus which mounts the X ray unit relative to base 10.

The lower ends 20 of vertical mounting members 18 are disposed in a rectangular shaped trunnion or frame 21. Trunnion 21 includes hubs 22, 23 which are pivotally connected at 24 to frame mounting plates 25, 26. Mounting members 18 are pivotally connected by any suitable pivot means such as bolt and nut assemblies 27, 28 to trunnion 21 whereby members 18 pivot about pins 27, 28 in the direction of the arrows "Q" and "R", shown in FIGS. 2 and 3, and trunnion 21 also is adapted to pivot about hubs 22, 23 in the direction of arrows "S" and "T", shown in FIGS. 2 and 6.

Figure 3:
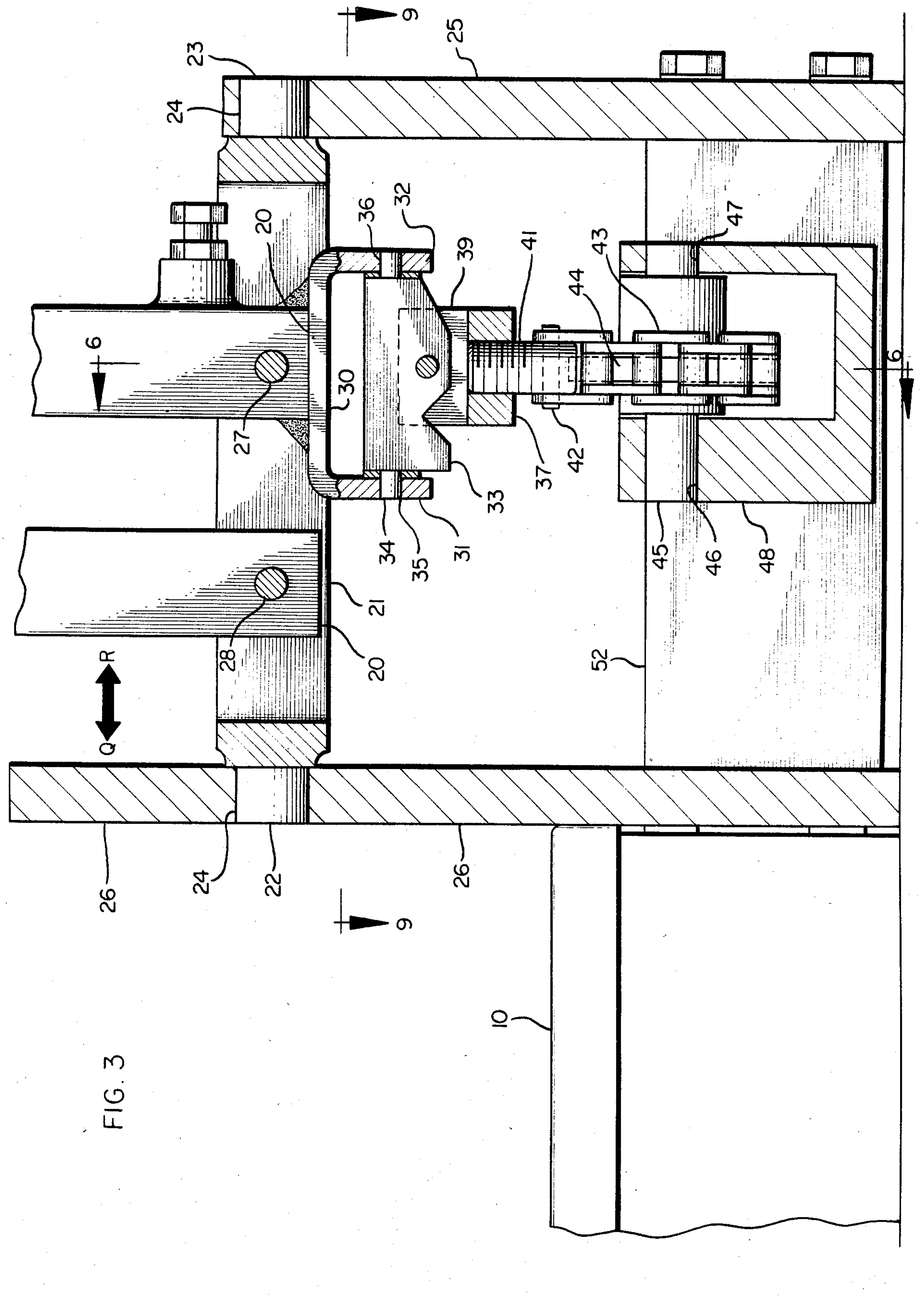
FIG. 3 shows a fragmentary section view of the mounting assembly utilized to mount the X ray unit taken along lines 3—3 in FIG. 2.
Figure 6:
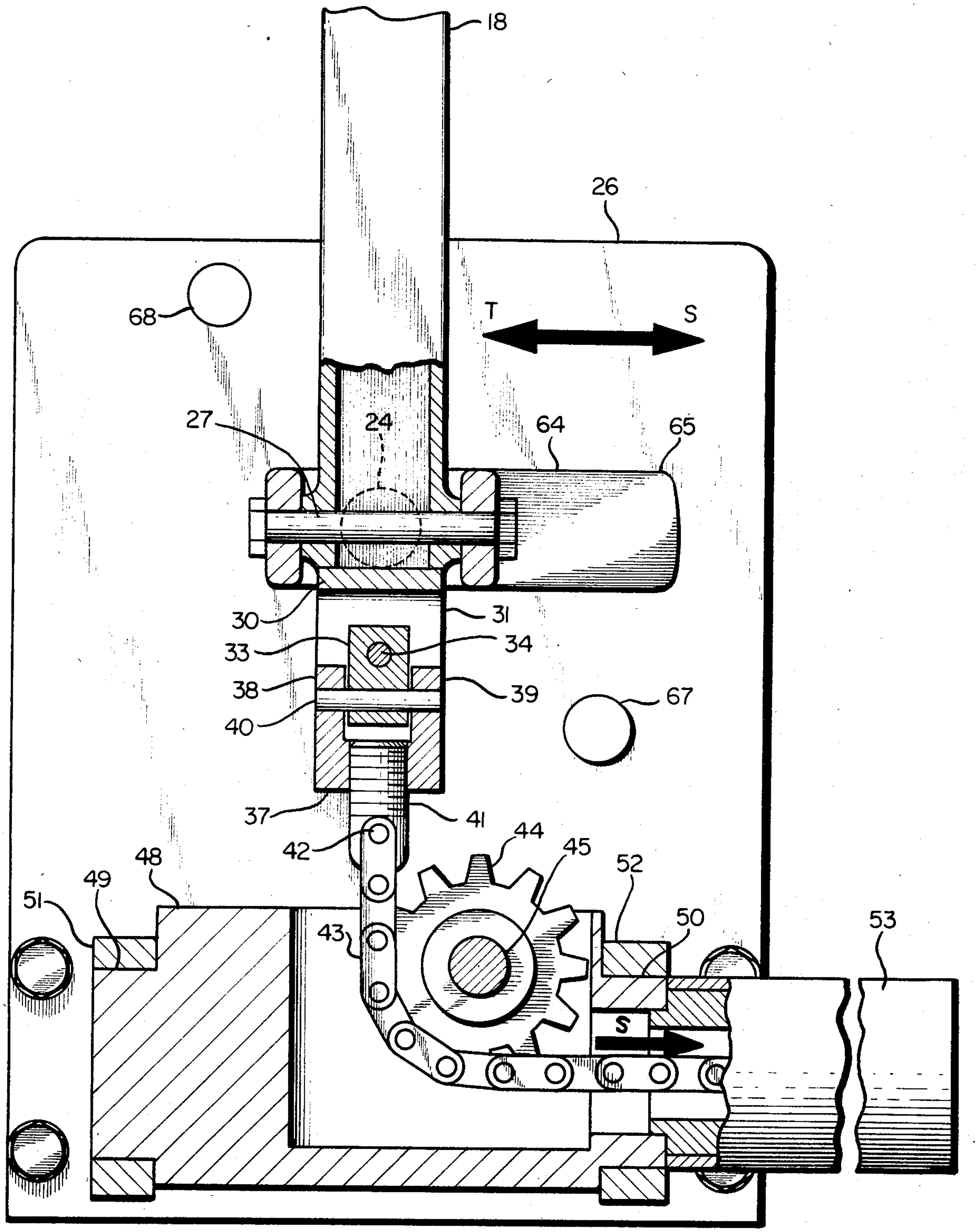
FIG. 6 shows a fragmentary section view of the mounting assembly taken along lines 6—6 in FIG. 3.
Figure 8:
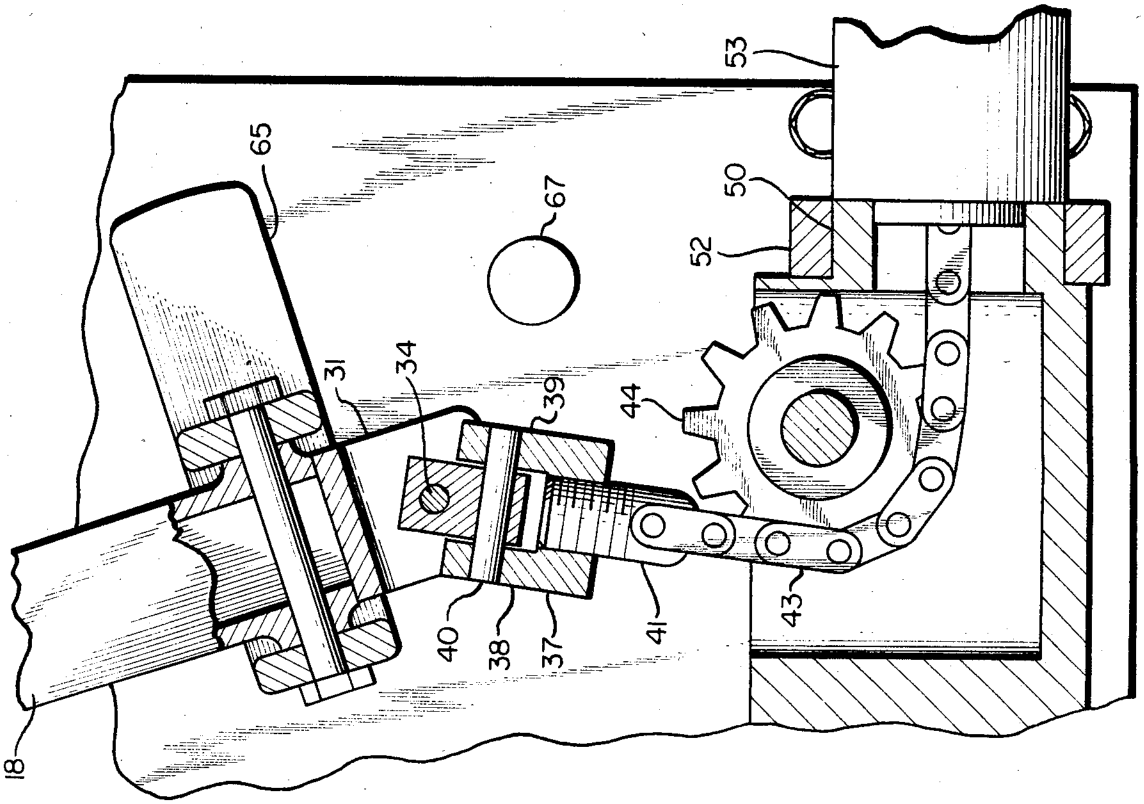
FIG. 8 shows a fragmentary section view of the mounting assembly of FIG. 6 except that the vertical mounting members are disposed at an acute angle opposite that shown in FIG. 7; and, FIG. 9 shows a fragmentary, plan section view of the mounting assembly of the present invention taken along lines 9—9 in FIG. 3.

Referring to FIGS. 3 and 6, a first yoke 30 having yoke arms 31, 32 is attached to end 20 of one of vertical mounting members 18. Block 33 having a pin 34 disposed therethrough is pivotally mounted at 35, 36 to yoke arms 31, 32.

A second yoke 37 having yoke arms 38, 39 is pivotally connected to block 33 by means of a pivot pin 40 which extends through block 33 and yoke arms 38, 39.

Fastener member 41 is threaded into second yoke 37 as shown, for example, in FIGS. 3 and 6. Fastener 41 is connected by means of a pin 42 to one end of chain 43 which is adapted to move on chain sprocket member 44.

Figure 4:
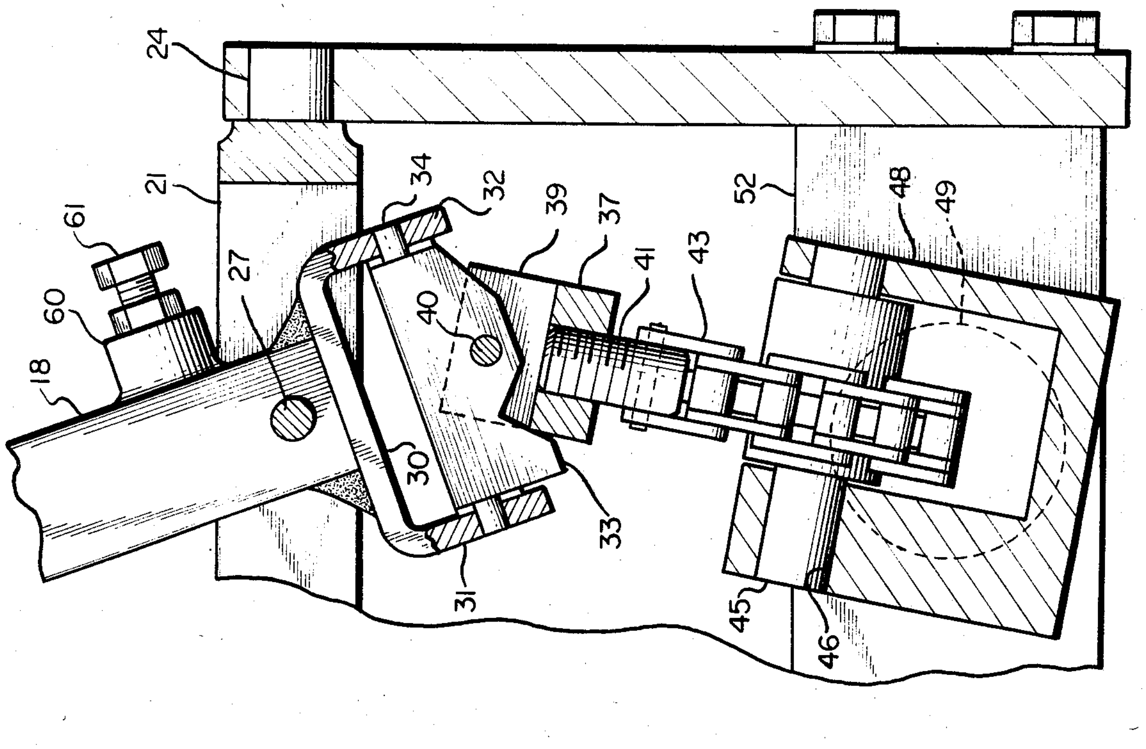
FIG. 4 shows a fragmentary section view of the mounting assembly of FIG. 3 but with the vertical mounting members pivoted at an acute angle from the vertical axis whereby the X ray unit is disposed closer to the patient foot platform than the machine position of FIG. 3.

Sprocket shaft 45 is passed through sprocket member 44 and is pinned to sprocket block 48 at 46, 47. As shown in FIGS. 2, 4, 6, sprocket block 48 includes hubs 49, 50 which are seated for rotation in lower mounting frame members 51, 52 which are joined to frame plates 25, 26.

The remaining end of chain 43 is fastened to one end of a compression spring, not shown, which is disposed in a conventional spring assembly 53 located in a substantially horizontal position as shown in FIGS. 2 and 6.

Figure 5:
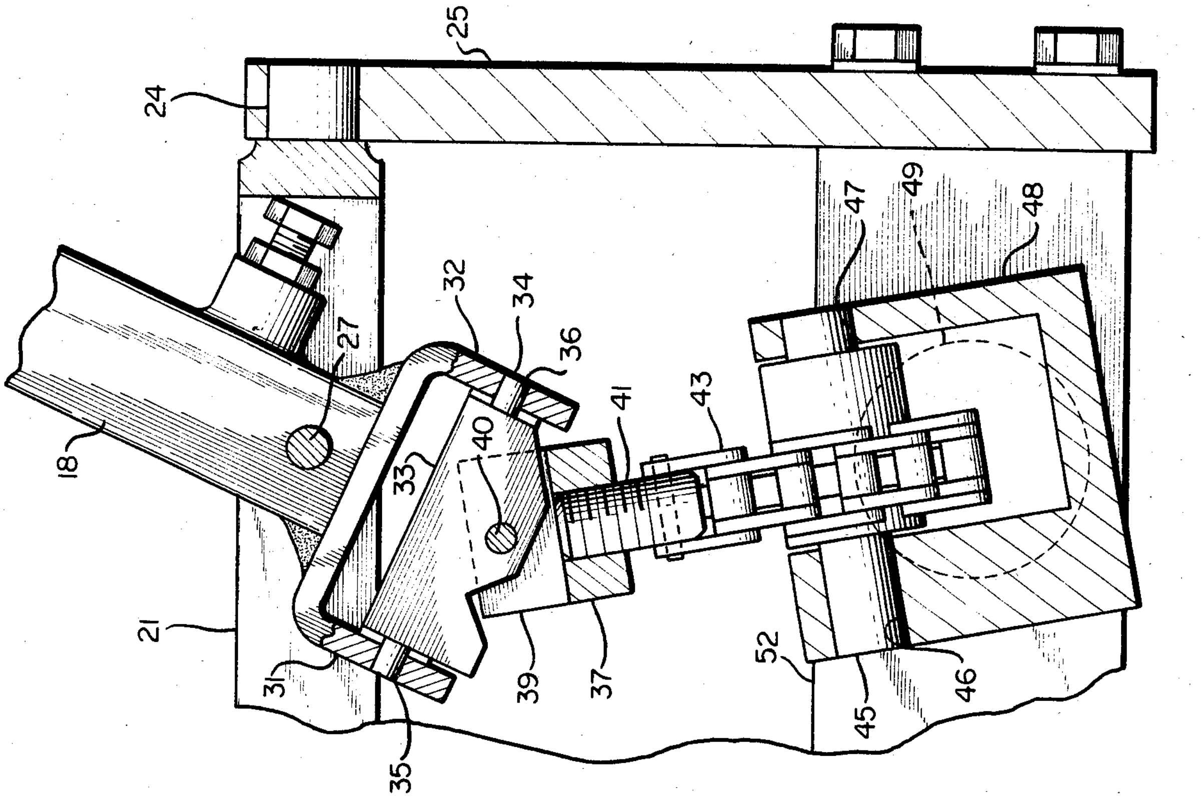
FIG. 5 shows a fragmentary section view of the mounting assembly of FIG. 3 whereby the vertical mounting members are disposed at an acute angle opposite that shown in FIG. 4.

Referring to FIGS. 4 and 5, an adjustable first stop means 60 having an adjustable bolt 61 is attached to mounting member 18 contiguous to end 20 and serves to limit the amount that mounting members 18 can pivot about pins 27, 28. As seen in FIG. 5, the adjustment of pin 61 serves to control the amount members 18 will pivot about pins 27, 28 in the direction of arrow "R" until bolt 61 abuts frame mounting plate 25. Members 18 can pivot in the direction of the arrow "Q" shown in FIGS. 2 and 3 until member 18 abuts mounting plate 26 which, as shown in FIG. 3, is taller than mounting plate 25. Accordingly, the amount of displacement of X ray machine 13 afforded by the mounting assembly of the present invention as shown in FIGS. 3–5 in the directions of the arrows of "Q" and "R" is limited.

The extent that members 18 can pivot in the directions of arrows "S" and "T", as shown in FIG. 2, is controlled by stop means 64, see FIG. 6, which comprises a stop arm 65 which extends outward from the pivotable trunnion 21 at a location on the frame contiguous to mounting plate 26. Stop lug 67 projects outward from plate 26 and serves to act as a stop, FIG. 7, such that when arm 65 contacts stop lug 67, mounting members 18 are precluded from further pivotal movement in the direction of the arrow "S" shown in FIGS. 1 and 6.

A second stop lug 68 shown in FIG. 6 projects outward from plate 26 and serves to abut arm 65 whereby the amount mounting members 18 can pivot in the direction of arrow "T", as shown in FIGS. 2 and 6, also is limited.

Figure 9:
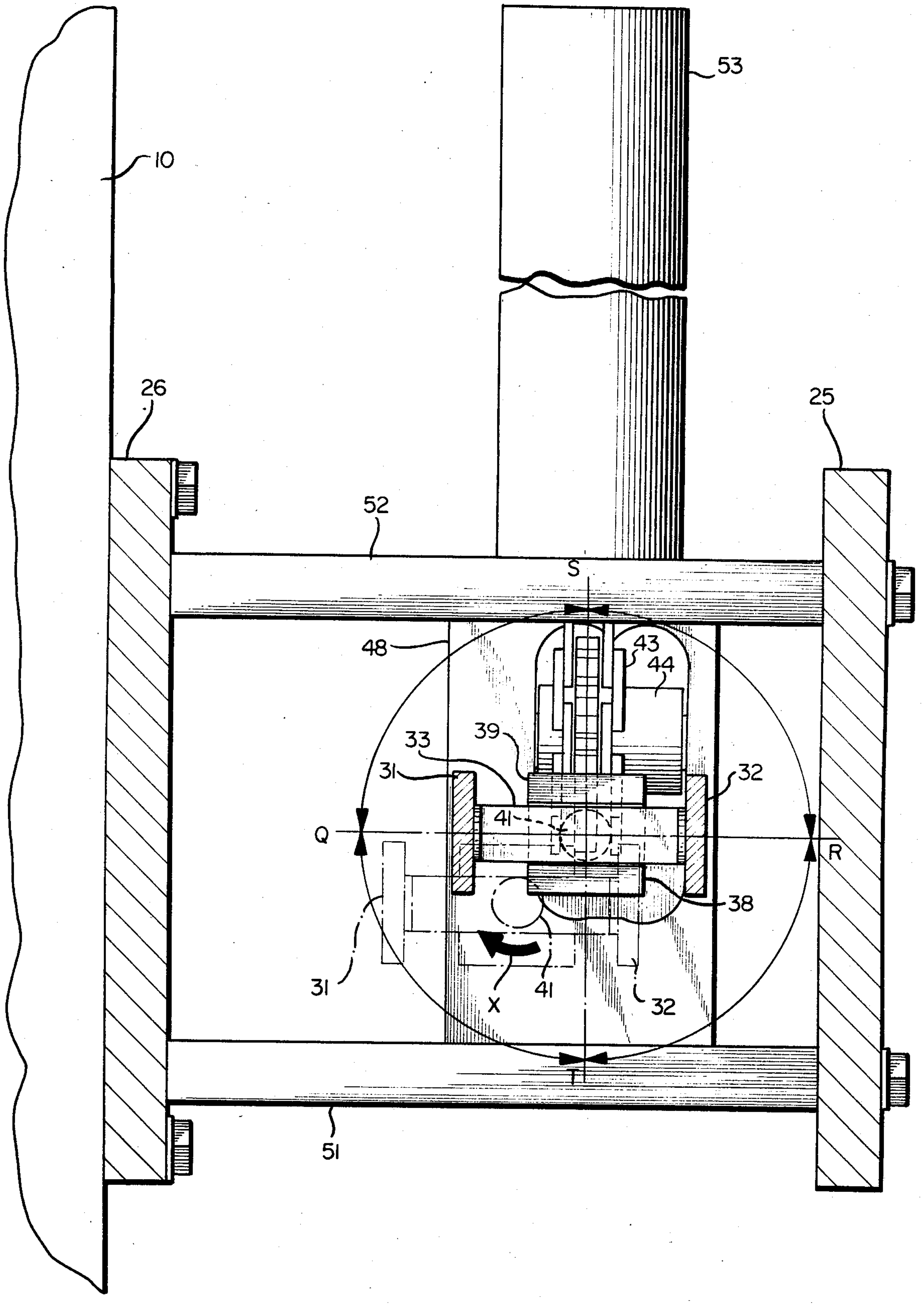

Viewing the FIGS. 3–5 and 6–8, it will be appreciated that the vertical mounting members 18 will rotate about the axes "Q" and "R" (FIGS. 3–5) and "S" and "T" (FIGS. 6–8) as illustrated by phantom lines in FIG. 9. There are occasions, however, when the X ray head must be rotated to a different position which requires the X ray machine 13 to be pivoted to a position such as illustrated by the phantom lines in FIG. 9. The mounting assembly of the present invention will permit such movement; however, it has been found that chain 43 has a tendency to twist when moved to a position off of the Q-R and S-T axes, the effect of which is to place an undesired torsional force upon chain 43. This force is avoided, however, because fastener member 41, which is threaded into yoke 37, is adapted to rotate as illustrated, for example, by the arrow "X" whereby chain 43 will not be twisted substantially such that an undesired torsional force is avoided.

Utilization of the pivotable yokes 30 and 37 and blocks 33 and 48 of the present invention serve to assist in providing the desired articulation of the X ray machine 13 without extensive movement of chain 43. Referring to FIGS. 3 and 4, it will be noted that pin 40 moves a relatively small amount relative to the movement of the X ray machine 13 such that extensive displacement of chain 43 does not occur.

Figure 7:
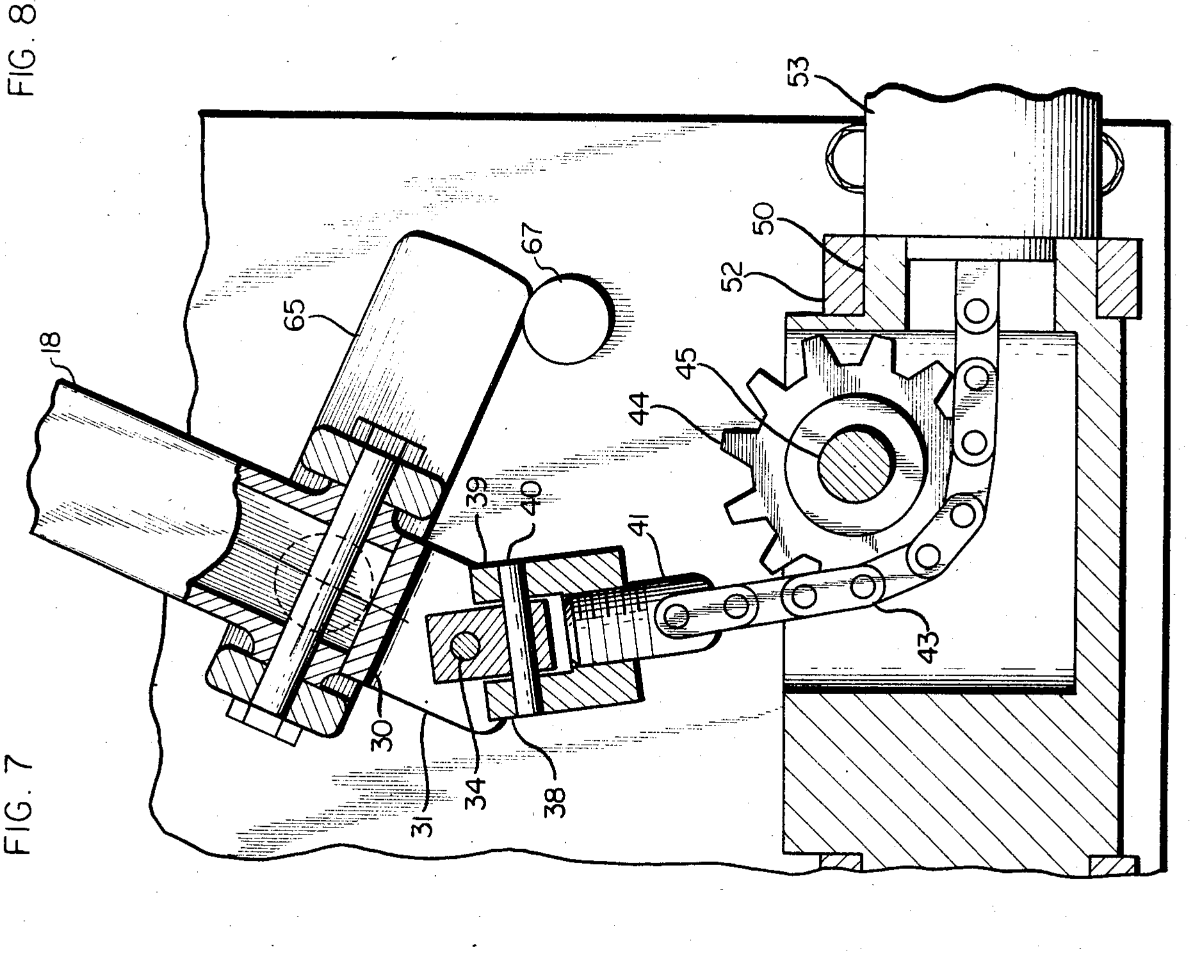
FIG. 7 shows a fragmentary section view of the mounting assembly of FIG. 6 but with the vertical mounting members pivoted at an acute angle from the vertical axis whereby the X ray unit is disposed closer to the horizontal spring assembly than the machine position of FIG. 6.

FIGS. 7 and 9 show displacement of the mounting members 18 relative to its vertical axis in the direction of the arrows "S" and "T". Utilization of the double yokes 30 and 37 and pivotable blocks 33 and 48 permit a relatively small amount of movement of pin 34 in comparison to the displacement of the X ray machine 13 such that only a relatively small displacement of chain 43 occurs.

It has been found that the new and improved mounting system of the present invention allows a low level foot platform to be employed while at the same time the freedom of desired movement of the X ray unit machine 13 is maintained.

While only one embodiment of the invention has been herein illustrated and described in detail, it will be understood that modifications and variations thereof may be effected without departing from the gist of the invention and the scope of the claims.

What is claimed:

1. An X ray unit having an X ray machine spaced from a foot platform and mounting means for mounting the X ray machine whereby it is adapted to be located at various selected positions relative to said platform, said mounting means including:

a vertical mounting means having first and second ends;

said X ray machine being connected to one end of said vertical mounting means;

a pivotable frame means pivotally connected contiguous to said remaining end of said vertical mounting means whereby said frame means and vertical mounting means pivot in different directions;

a first linking means connected to said remaining end of said vertical mounting means for pivoting said vertical mounting means;

a block means pivotally connected to said first linking means;

a second linking means pivotally connected to said block means; and, biasing means connected to said second linking means for biasing said vertically mounting means in a normally vertical position.

2. An X ray unit in accordance with claim 1 wherein said first linking means includes a first yoke.

3. An X ray unit in accordance with claim 2 wherein said second linking means includes a second yoke.

4. An X ray unit in accordance with claim 3 wherein said biasing means further includes:

a rotatable fastener means threaded for rotation in said second yoke;

a chain sprocket mounted in a pivotable sprocket block means;

a spring means disposed contiguous to said sprocket block means; and, a chain member disposed on said sprocket and having one end of said chain connected to said spring means and the remaining chain end connected to said rotatable fastener means.

5. An X ray unit in accordance with claim 4 wherein said spring means is disposed in a substantially horizontal position.

6. The X ray unit of claim 1 and further including stop means for limiting the movement of said mounting means relative to said foot platform.

7. An X ray unit for use in podiatry, said unit comprising:

a foot platform;

an X ray machine positioned above the foot platform;

a vertical leg means having first and second ends;

said X ray machine being connected to said first end of said leg means;

a frame means pivotally connected to said leg means contiguous to said remaining leg means end;

said frame means and leg means being adapted to pivot in different directions relative to each other;

a first yoke means connected to said remaining end of said leg means;

a block means pivotally connected to said first yoke means;

a second yoke means pivotally connected to said block means;

said second yoke means having a rotatable fastener threaded into said yoke means;

a pivotable sprocket block means spaced from said fastener;

a rotatable sprocket disposed in said chain sprocket block means;

a biasing means disposed contiguous to said chain sprocket block means;

a chain member disposed on said sprocket and having two ends, one of said chain ends being connected to said fastener; and, the remaining chain end being connected to said biasing means.

8. The X ray unit of claim 7 wherein said first yoke means and second yoke means are offset at right angles to each other.

9. The X ray unit of claim 7 wherein said biasing means includes a spring assembly disposed in a substantially horizontal position.

10. The X ray unit of claim 7 wherein said vertical leg means comprises a pair of vertical leg members.

11. The X ray unit of claim 10 wherein said pivotable frame is rectangular shaped and said vertical members are each pivotably connected to said frame.

12. The X ray unit of claim 11 wherein said chain sprocket block means includes a hub at each end of said block means; and, a pair of frame plates each having an opening therein to receive one of said sprocket block means hubs.

13. The X ray unit of claim 7 wherein said base platform is normally disposed about two-and-one-half to three-and-one-half inches above floor level.

14. The X ray unit of claim 11 wherein said frame member includes a hub at opposite ends of the frame; and, a pair of frame mounting plates each having an opening therein to receive one of said frame hubs.

15. The X ray unit of claim 7 and further including stop means for limiting the movement of said vertical leg means relative to said foot platform.

* * * * *